G. B. KOHLER.
PASSENGER CAR.
APPLICATION FILED MAY 14, 1914.

1,164,530.

Patented Dec. 14, 1915.
3 SHEETS—SHEET 1.

Witnesses—
Charles H. York
Will H. Burrows

Inventor—
George B. Kohler
by his Attorneys—
Howson & Howson

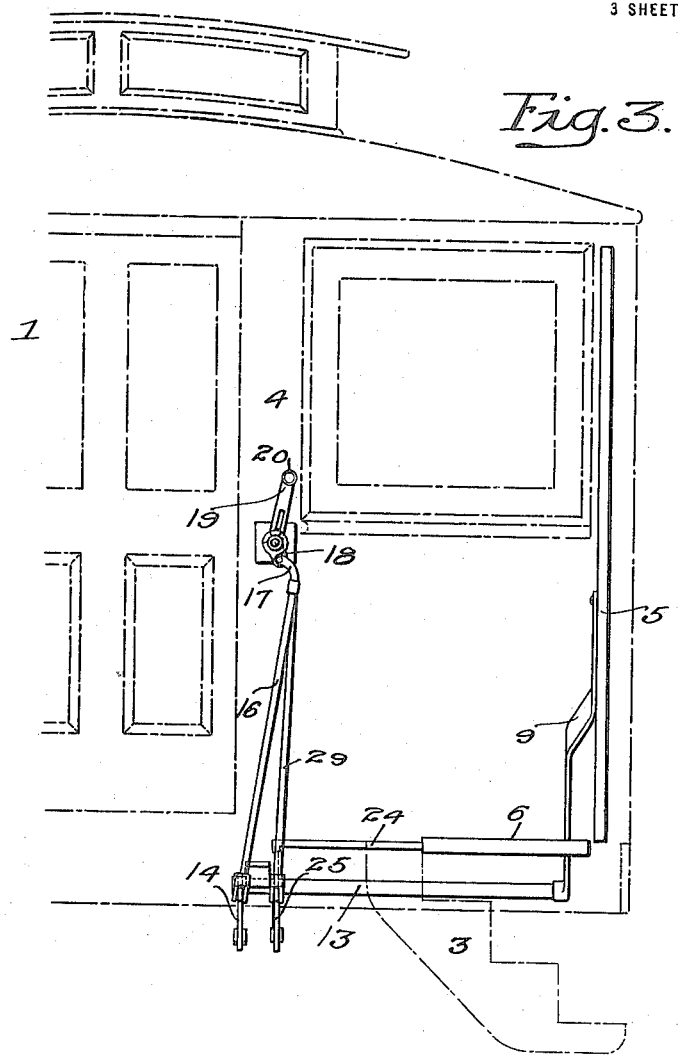

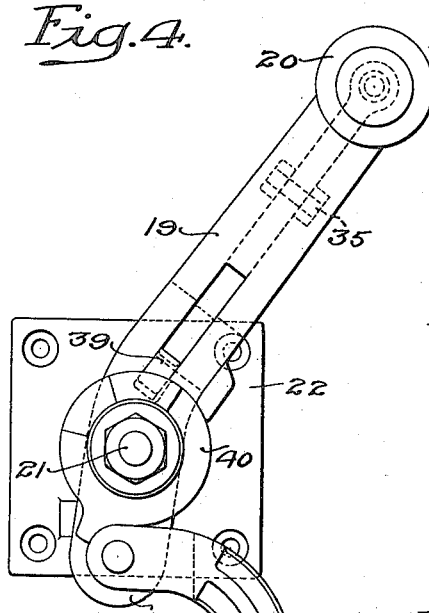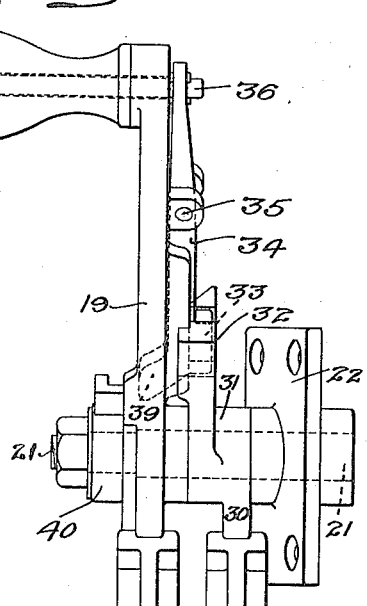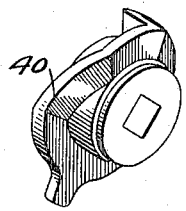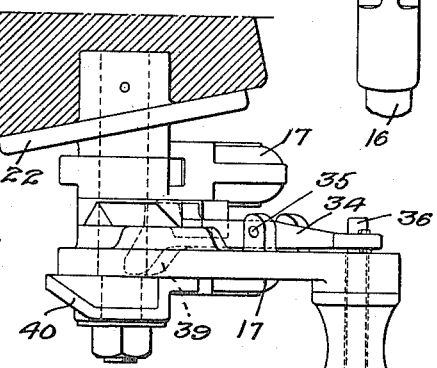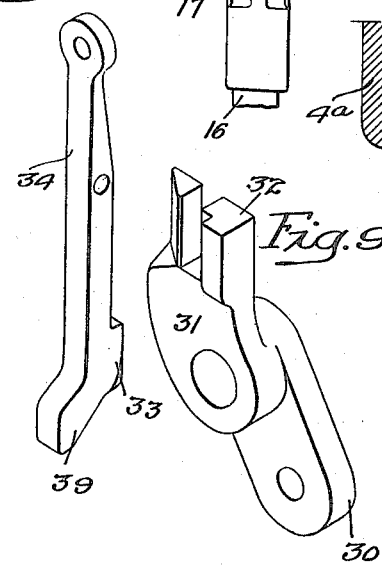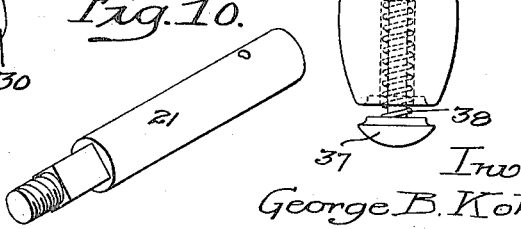

UNITED STATES PATENT OFFICE.

GEORGE B. KOHLER, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

PASSENGER-CAR.

1,164,530.  Specification of Letters Patent.  Patented Dec. 14, 1915.

Application filed May 14, 1914. Serial No. 838,506.

*To all whom it may concern:*

Be it known that I, GEORGE B. KOHLER, a citizen of the United States, residing in Philadelphia, Pennsylvania, have invented certain Improvements in Passenger-Cars, of which the following is a specification.

My invention relates to certain improvements in railway passenger cars, particularly for interurban service, which are usually made up into trains and in which the doors are operated by mechanism at the end of the platform, so that the doors of two adjoining platforms can be opened and closed by one operator. This type of car is provided with steps so that passengers can enter or leave the car from the ground or from the platform. It is now desirable, in many instances, where station platforms are used, to have them on a level with the floor of the platform of the car and trap doors are used which extend over the steps and form a continuation of the platform of the car, so that, when the door is open, a passenger can enter or leave the car on the level. These platforms have been used on cars on some roads where the stops are infrequent, but on interurban and on street railways, where the cars are made up in trains, it is not practical to use these trap doors, which are generally operated by hand.

One object of my invention is to provide a passenger car with a trap door which will cover the steps and also to provide a door which will close the side of the platform, and to operate these two elements from a point at the end of the platform so that the mechanism on two adjoining cars can be operated at the same time.

A further object of the invention is to provide means whereby the side doors can be operated without the trap doors and both doors can be operated in unison, but in no case can the trap doors be operated without first operating the main doors.

Figure 1:
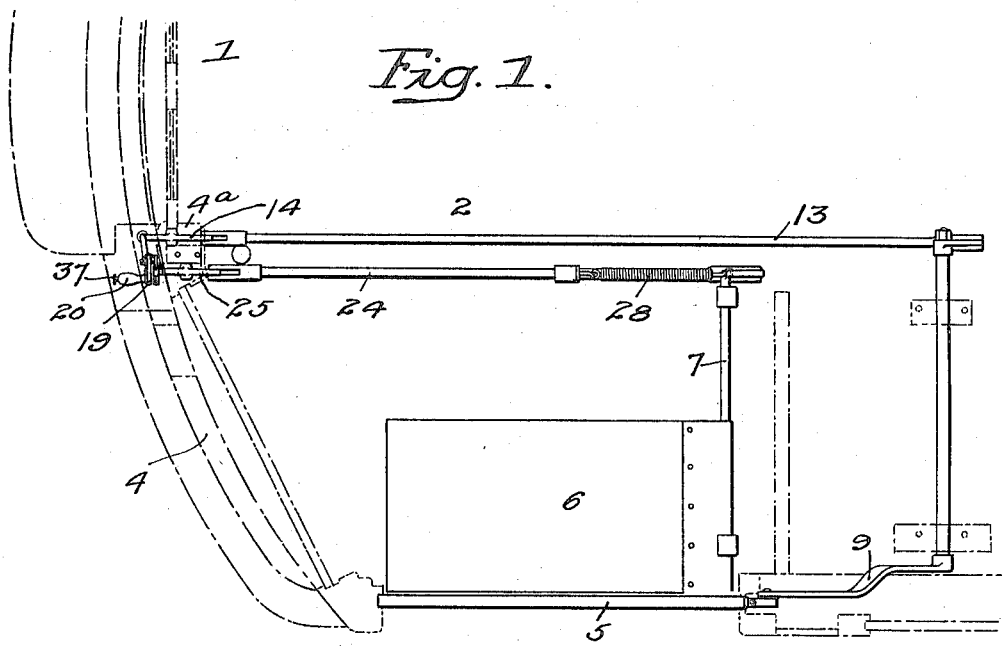
Figure 2:
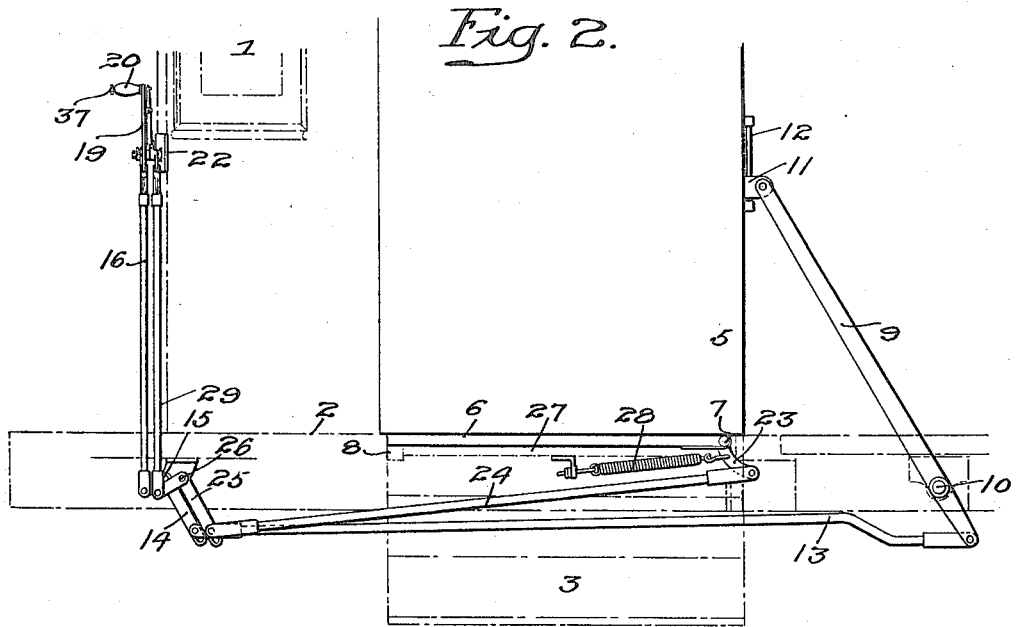

In the accompanying drawings: Figure 1, is a plan view of one end of a passenger car illustrating my invention and showing the doors closed and the car body in dotted lines; Fig. 2, is a side view, showing the doors closed; Fig. 3, is an end view of a portion of a passenger car, showing the operating mechanism on the outside of the platform closure; Fig. 4, is a front elevation of the operating handle; Fig. 5, is a side view of the same; Fig. 6, is a plan view, showing one of the posts of the car in section; and Figs. 7, 8, 9 and 10, are perspective views illustrating details of the invention.

Referring to the drawings, 1 is the body of the car.

2 is the platform.

3, 3 are the steps leading from the platform to the side of the car.

4 is the framework forming the closure for the platform. The steps are inside of the side lines of the car and the door 5, which, in the present instance, is a sliding door, is at the side of the car in line with the bottom step.

6 is the trap door hinged at 7 and, when closed, rests on a ledge 8 of the platform so as to entirely close the platform, making the floor thereof level.

If a station platform is on a level with the platform of a car then it is only necessary to operate the side door and passengers can enter and leave the car without using the steps, but if the platform is below the level of the car platform then both the side door and the trap doors are moved so that passengers can use the steps. The side door 5, in the present instance, is a sliding door and is connected by a lever 9 pivoted at 10. The long arm of the lever is connected to a sliding block 11 on a rail 12 secured to the rear of the door, while the short arm of the lever is connected by a rod 13 to one arm of a bell crank lever 14 pivoted at 15. Attached to the short arm of the bell crank lever 14 is a rod 16, bent at its upper end at 17 and attached to the short arm 18 of a hand lever 19 provided with a suitable handle 20. The hand lever 19 is mounted on a stud 21 carried by a bracket 22 secured to the framing of one of the posts 4ᵃ of the platform, so that, on turning the operating handle 19, the doors 5 will be opened and closed, as desired. The pivot shaft 7 of the trap door 6 is mounted in suitable bearings in the frame of the platform and has an arm 23 connected by a rod 24 to one arm of a bell crank lever 25 pivoted at 26. Connecting the arm 23 to a bracket 27 on the underside of the permanent floor of the platform is a coiled spring 28, which tends to counterbalance the weight of the trap door so that it can be readily raised. The bell crank lever 25 is connected by a rod 29 to an arm 30 of a lever 31 mounted on the stud 21. The other arm 32 of this lever is in the form of a socket and is arranged to receive the portion 33 of the latch 34 pivoted at 35 to a handle 19. This latch is attached to a push rod 36, which extends through the handle 20 and has a button 37 at its upper end, and between this button and a shoulder on the handle is a coiled spring 38 which tends to force the button out and the part 33 of the latch 34 in the socket 32 of the lever 31, which is loose on the stud. The lever 34 has an extension 39 and secured to the stud 21 is a cam 40 with which the extension 39 engages. The object of this construction is to insure the opening of the door and the platform in unison, so that the platform cannot be partly raised and closed without opening and closing the door at the side of the car. When it is desired to open the side door only, then the button is pushed in so as to disengage the two levers and immediately after the latch on the hand lever passes the lever 31 of the trap door, the button can be released and the movement of the side door can be continued independently of the movement of the trap door. On the return movement, the latch will spring back into the socket 32, as it is beveled at the rear as shown in the perspective view, Fig. 8.

It will be noticed that there are two sets of mechanisms at each side of each platform, and the mechanisms on one platform are in line with those of the other platform so that an operator standing between the two platforms can operate one side door and one trap door at one side of each platform, as in this type of car only one side of a car is used for the entrance and exit of passengers. Thus, the opening and closing of the trap door is accomplished simultaneously with the opening and the closing of the side door without the necessity of the operator leaving his stand between the two cars. The control of both doors is out of the reach of passengers.

I claim:—

1. The combination in a passenger car, of a platform; steps at one side of the platform; a side door closing the side of the platform; a trap door extending over the steps; means for actuating the side door and the trap door in unison; and mechanism for disengaging the trap door so that the side door can be actuated while the trap door remains closed.

2. The combination of a passenger car having a platform; steps at one side of the platform; a sliding door arranged to close the side of the platform; a trap door extending from the fixed floor of the car to the side door and covering the steps; a pivot for said trap door; two lever mechanisms, one connected to the side door and the other to the trap door and both terminating at the same point; a handle for actuating the side door; and means, on the handle, for engaging or disengaging the mechanism controlling the trap door.

3. The combination in a passenger car, of a platform; steps at one side of the platform; a door closing the side of the platform; a trap door extending over the fixed portion of the platform to the side door and over the steps; a pivot for the trap door; an arm on the pivot; a counterbalancing spring attached to the arm and to a fixed point on the platform; lever mechanism connecting the arm with the operating lever; and lever mechanism connecting the operating lever with the side door.

4. The combination in a passenger car, of a platform having steps at one side; a sliding door closing the side of the platform; a trap door extending from the fixed floor of the platform to the side door and over the steps; a pivoted operating lever; means connecting the said lever with the side door; a lever loosely mounted on the same pivot as the operating lever and having a socket; a lever on the operating lever arranged to enter the socket and to connect the two levers together; and means coupling the loose lever with the trap door so that, on turning the operating lever, the side door can be moved independently of, or in unison with, the trap door.

In testimony whereof, I have signed my name to this specification, in the presence of two subscribing witnesses.

GEORGE B. KOHLER.

Witnesses:
WM. E. SHUPE,
WM. A. BARR.

Copies of this patent may be obtained for five cents each, by addressing the "Commissioner of Patents, Washington, D. C."